April 10, 1928.  1,665,280
A. H. RZEPPA
UNIVERSAL JOINT
Filed April 2, 1927   2 Sheets-Sheet 2

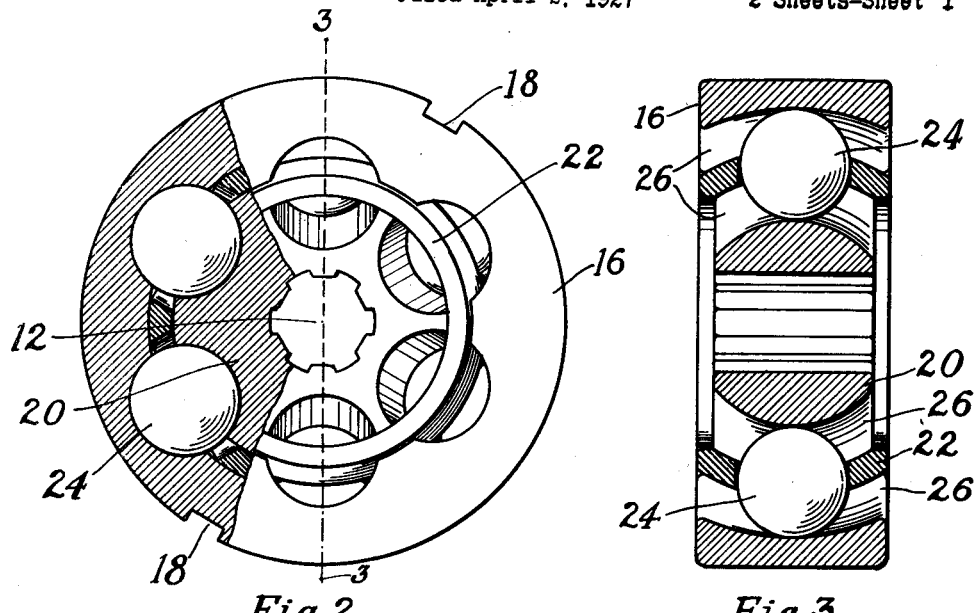
Fig.2.
Fig.3.
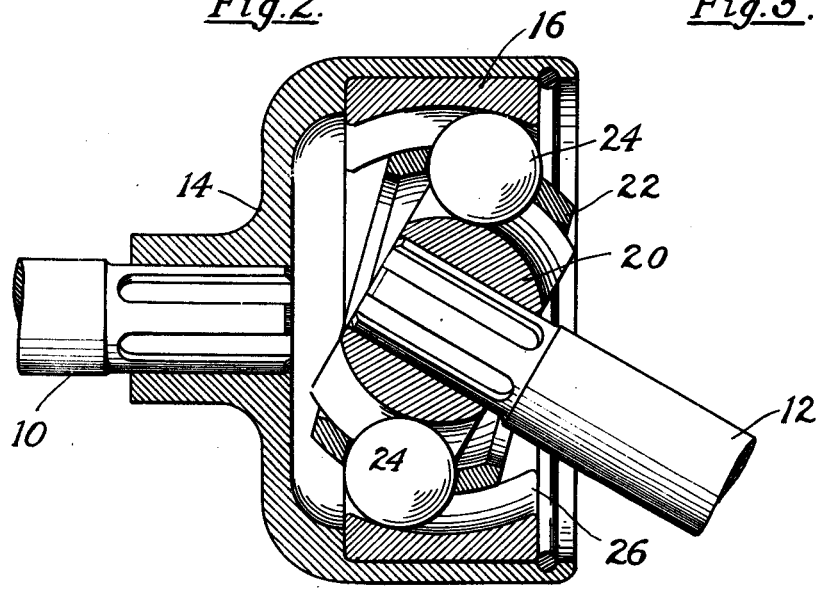
Fig.1.

INVENTOR.
Alfred H. Rzeppa
BY
Parker & Burton
ATTORNEYS

Patented Apr. 10, 1928.

1,665,280

UNITED STATES PATENT OFFICE.

ALFRED H. RZEPPA, OF DETROIT, MICHIGAN.

UNIVERSAL JOINT.

Application filed April 2, 1927. Serial No. 180,359.

My invention relates to an improved universal joint.

The object is to provide a universal joint which is inexpensive to manufacture, simple and sturdy in construction, efficient in operation and which comprises a minimum number of easily assembled integral parts. My universal joint is so constructed that it represents a self-contained unit adapted for a variety of uses and readily capable of being combined with different shaft sections. The component parts of my universal joint are integrally formed and the construction is such as to permit their assembly or disassembly without deformation of any part.

My improved universal joint is adapted to permit the driving of shafts arranged at relatively large driving angles and the driving torque is uniformally distributed through the coupling member and there is a minimum of friction in the relative angular changes which permit the universal movement of the connection. My universal joint is of such a character that the shaft sections connected thereby maintain a uniform speed of rotation without wabble of their normal axes of revolution.

In the drawings:

Fig. 1 is a sectional view through my improved universal joint.

Fig. 2 is an elevation partly broken away of the universal joint proper.

Fig. 3 is a cross-section taken on line 3—3 of Fig. 2.

Figures 4, 5:
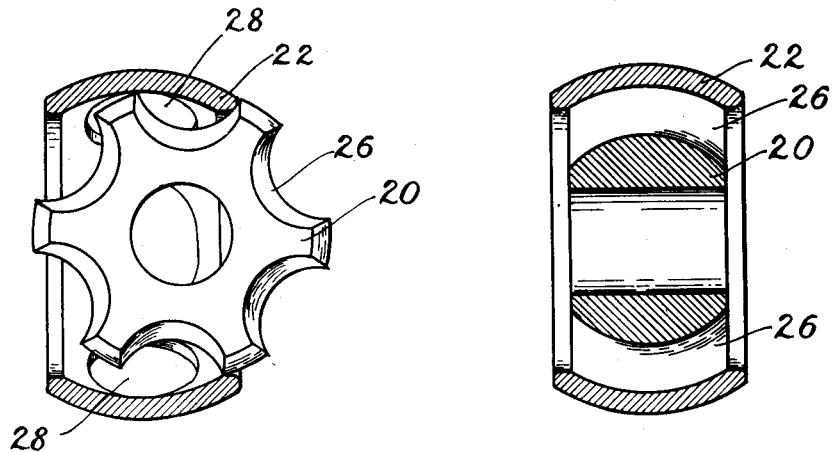
Figs. 4, 5, 6 and 7, show successive steps in the assembly of my universal joint construction.

One of the meritorious features of my invention is to provide a universal joint as hereinbefore specified which is so constructed as to be adaptable for many uses and which possesses a unitary character of such a kind that the universal joint proper may be marketed in much the same fashion as a ball bearing is marketed and which may be fitted into place between shaft sections provided with suitable corresponding end fittings.

In Fig. 1 I have shown a pair of shaft sections 10 and 12. Upon one of these sections is splined a housing 14 which is adapted to receive my universal joint assembly. The other shaft section is splined to be coupled with my universal joint assembly so that driving torque may be transmitted through the two sections while disposed angularly with respect to each other.

My universal joint assembly comprises a self-contained unit which consists of an outer race member 16 which is adapted to be received within the housing 14 and may be locked thereto through keys employed in keyways 18 or in any other suitable manner; an inner race member 20; a ball cage 22 which is received between the two race members; and a plurality of locking balls 24 which couple the several members together.

The inner race member 20 is splined upon the shaft 12. The two race members are provided with correspondingly located ball receiving grooves 26. The cage is provided with a plurality of ball receiving holes 28.

The race members and the ball cage member are so proportionately arranged in size that when they are completely assembled as shown in Figs. 1, 2 and 3, they will retain their assembled condition. The inner race member is receivable within the cage as indicated in Fig. 4 and when inserted at an angle therein, as shown in such figure of the drawing, it may be rotated through an arc of 90° to bring the same in the position shown in Fig. 5. The inner race member and the ball cage may then be inserted into the outer race member as shown in Fig. 6, and when inserted therein so that the axes of the two spherical parts are brought into coincidence, the ball cage member and the race member may be likewise rotated through an arc of 90° to bring the several members into the position shown in Fig. 3.

Figures 6, 7:
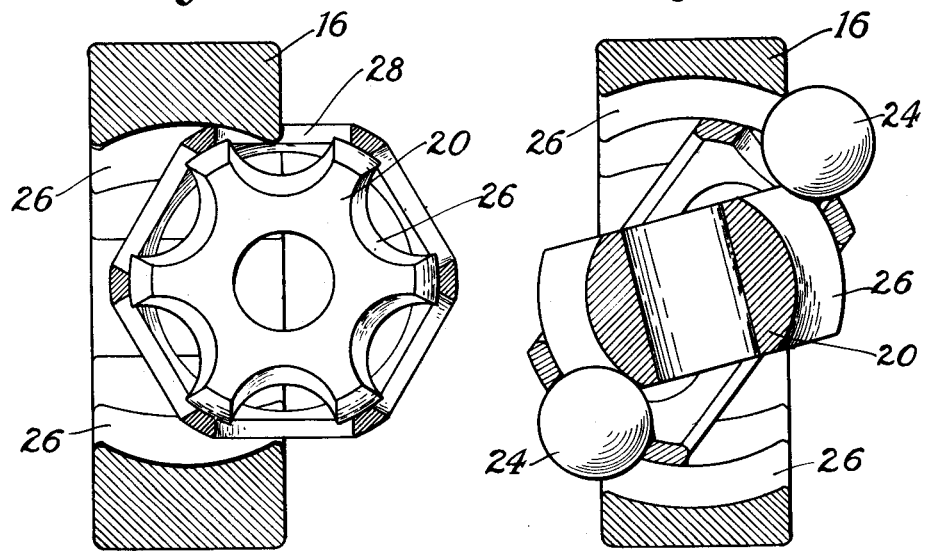

The balls may now be inserted in place and this is done by tilting the parts as shown in Fig. 7 and inserting one ball at a time or inserting oppositely disposed balls simultaneously.

What I claim is:

1. In combination with a pair of shafts, an independent universal connection unit for such shafts comprising an outer ball race member and an inner ball race member, said members provided with registering curved ball receiving grooves, a ball cage between said members, balls carried by said cage within the grooves of said race members to lock said members to rotate together, a socket on one shaft receivable over said universal connection unit and means to lock the outer ball race member thereto to rotate therewith, and a part on the other shaft engageable within the inner race member to lock it to rotate therewith.

2. In combination with a pair of shafts, a universal joint connection unit therefor comprising an integral outer ball race member, an integral inner ball race member, said ball race members provided with curved corresponding ball receiving grooves, balls in said grooves coupling said members together for rotation, said unit adapted to be detachably connected as an entirety through the outer race member with one shaft for rotation therewith and to be detachably connected as an entirety through said inner race member with the other shaft to rotate therewith.

3. In combination with a pair of shafts, a universal joint connection unit therefor comprising an outer ball race member, an inner ball race member, said ball race members provided with corresponding curved ball receiving grooves, balls in said grooves coupling said members together for rotation, said inner ball race member having a maximum diameter midway between its sides greater than the minimum diameter of the outer ball race member along one of its sides.

4. In combination with a pair of shafts, a universal joint connection unit therefor compising an outer ball race member, an integral inner ball race member removably receivable within the outer ball race member, said ball race members provided with corresponding curved ball receiving grooves, balls in said grooves coupling said members together for rotation, said inner ball race member having a maximum diameter midway the ends of the grooves greater than the minimum diameter of the outer ball race member between its grooves and having a minimum diameter midway the ends of its grooves less than the minimum diameter of said outer ball race member.

5. A universal joint comprising in combination an integral outer ball race member, an integral ball cage member removably receivable within said outer race member, an integral inner ball race member removably receivable within said cage member, said cage member provided with a plurality of ball receiving holes, said outer race member and said inner race member provided with correspondingly arranged ball receiving grooves, a plurality of balls located within the holes of the cage member and the grooves of the inner and outer race members coupling said members together for rotation, said cage member having an internal minimum diameter less than the maximum diameter of the inner race member between its grooves, and said cage having a maximum external diameter between its holes greater than the minimum internal diameter of the outer race member between its grooves.

6. A universal joint comprising in combination an integral outer ball race member, an integral ball cage member removably receivable within said outer member, an integral inner ball race member removably receivable within said cage member, said cage member provided with a plurality of ball receiving holes, said outer race member and said inner race member provided with correspondingly arranged ball receiving grooves, a plurality of balls located within the holes of the cage member and the grooves of the inner and outer race members coupling said members together for rotation, each member having a maximum external diameter greater than the minimum internal diameter of the member within which it is received.

7. A universal joint comprising in combination an integral outer ball race member, an integral ball cage member removably receivable within said outer member, an integral inner ball race member removably receivable within said cage member, said cage member provided with a plurality of ball receiving holes, said outer race member and said inner race member provided with correspondingly arranged ball receiving grooves, a plurality of balls located within the holes of the cage member and the grooves of the inner and outer race members coupling said members together for rotation, each member having a maximum diameter midway between its sides greater than the internal diameter of the member within which it is received at its side.

8. A universal joint including, in combination, an integral outer ball race member, an integral ball cage removably receivable within said race member, said cage provided with a plurality of ball receiving holes and having a diameter through oppositely disposed holes less than the minimum diameter of the race member and a diameter through the portions between the holes greater than such minimum diameter.

9. In combination with a pair of shafts, an independent detachable universal connection therefor comprising a unitary outer ball race member detachably coupled to one shaft to rotate therewith, a unitary inner ball race member detachably coupled to the other shaft to rotate therewith, said race members provided with correspondingly disposed curved ball receiving grooves, said inner ball race member being removably received within the outer member but incapable of removal therefrom except when disposed angularly with respect thereto, and balls in said grooves locking said members together.

10. A universal joint comprising an integral outer ball race member, an integral ball cage removably receivable therein, an integral ball race member removably receivable within the cage, said ball race members provided with correspondingly disposed curved ball receiving grooves, said cage provided with ball receiving holes, balls in said holes positioned within the grooves of the race members, said inner ball race member being capable of removal from or insertion into the cage only when the axis thereof is positioned substantially perpendicularly to the axis of the cage and said cage being removable from or capable of insertion into the said outer ball race member only when the axes of the two members are substantially perpendicular with respect to each other.

In testimony whereof, I, ALFRED H. RZEPPA, sign this specification.

ALFRED H. RZEPPA.